United States Patent
Weder et al.

(10) Patent No.: US 7,495,502 B2
(45) Date of Patent: Feb. 24, 2009

(54) CIRCUIT ARRANGEMENT AND METHOD FOR OPERATING A CIRCUIT ARRANGEMENT

(75) Inventors: Uwe Weder, Au Hallertau (DE); Korbinian Engl, Kirchasch (DE); Holger Sedlak, Sauerlach-Lochhofen (DE); Bernd Zimek, Graz (AT)

(73) Assignee: Infineon Technologies AG (DE)

( * ) Notice: Subject to any disclaimer, the term of this patent is extended or adjusted under 35 U.S.C. 154(b) by 89 days.

(21) Appl. No.: 11/615,542

(22) Filed: Dec. 22, 2006

(65) Prior Publication Data

US 2007/0159747 A1 Jul. 12, 2007

(30) Foreign Application Priority Data

Dec. 22, 2005 (DE) ............... 10 2005 061 573

(51) Int. Cl.
*G05F 1/10* (2006.01)
(52) U.S. Cl. .................. 327/538; 327/292
(58) Field of Classification Search ............ 327/292, 327/299, 538, 543
See application file for complete search history.

(56) References Cited

U.S. PATENT DOCUMENTS

| 4,309,650 | A |   | 1/1982 | Boros et al. |   |
|---|---|---|---|---|---|
| 5,568,083 | A | * | 10/1996 | Uchiyama et al. | 327/538 |
| 5,760,636 | A | * | 6/1998 | Noble et al. | 327/513 |
| 5,812,004 | A | * | 9/1998 | Little | 327/291 |
| 6,484,041 | B1 | * | 11/2002 | Aho et al. | 455/574 |
| 7,049,797 | B2 | * | 5/2006 | Fukui et al. | 323/281 |
| 7,194,647 | B2 | * | 3/2007 | Flynn | 713/322 |

OTHER PUBLICATIONS

"Intels Dual-Core-Prozessor Montecito nimmt Formen an;" Electronik May 2005.
Akui et al., "Dynamic Voltage and Frequency Management for a Low-Power Embedded Microprocessor;" IEEE International Solid-State Circuits Conference 2004, pp. 64-65 (Sony).
Chou, Sunlin, "Integration and Innovation in the Nanoelectronics Era;" IEEE International Solid-State Circuits Conference 2005, pp. 36-38 (Intel).
Nakai et al., "Dynamic Voltage and Frequency Management for a Low-Power Embedded Microprocessor;" IEEE Journal of Solid-State Circuits, 2005;40(1):28-34.
Rohrer, et al., "PowerPC 970 in 130nm and 90nm Technologies;" IEEE International Solid-State Circuits Conference 2004, pp. 68-69 (IBM).

* cited by examiner

*Primary Examiner*—Jeffrey S Zweizig
(74) *Attorney, Agent, or Firm*—Dickstein, Shapiro, LLP.

(57) ABSTRACT

A circuit arrangement including a voltage supply device, which has an output, and that provides a variable supply voltage, a supply-voltage-controlled clock generator, which is coupled to the output of the voltage supply device, and that provides a system clock signal having a variable effective system clock frequency, a circuit section having a supply terminal, which is coupled to the output of the voltage supply device, and a clock input, which receives the system clock signal, and a regulating device that determines a supply-voltage-dependent supply current value and detects the extent to which the supply current value lies within a predetermined current value range, and which is coupled to the voltage supply device such that the supply voltage is regulated based on whether the supply current value lies within the predetermined current value range.

33 Claims, 3 Drawing Sheets

CIRCUIT ARRANGEMENT AND METHOD FOR OPERATING A CIRCUIT ARRANGEMENT

CROSS-REFERENCE TO RELATED APPLICATION

This application claims priority to German Patent Application Serial No. 10 2005 061 573.2, which was filed Dec. 22, 2005, and is incorporated herein by reference in its entirety.

FIELD OF THE INVENTION

The invention relates to a circuit arrangement operated in clocked fashion and to a method for operating such a circuit arrangement.

BACKGROUND

Current-saving operation is striven for in digital circuit arrangements operated in clocked fashion. In this case, the processing speed associated with the system clock is intended to be as high as possible without exceeding a predetermined maximum average current consumption of the circuit arrangement. The maximum permissible average current consumption results for example due to design dictates or on account of a standardization. A circuit arrangement with a microprocessor used in a smart card is just one example of a circuit arrangement having a predetermined maximum permissible average current consumption.

A circuit arrangement comprises a multiplicity of circuit sections which interact during operation. Circuit sections may be formed for example as a memory, as an arithmetic unit or as logic elements. Since it is usually the case that not all of the circuit sections are operated simultaneously, some circuit sections are switched on and off or have a variable current consumption, the average current consumption of the circuit arrangement varies during operation.

In order to ensure that a predetermined current consumption, also referred to as current limit, is not exceeded, the constant system clock frequency with which the circuit arrangement is clocked can be reduced to an extent such that under the worst possible operating conditions, which depend inter alia on the temperature and the processing, the current limit is not exceeded. Through operation with the current limiting frequency determined in this way, the current limit is on no account exceeded. A disadvantage is that the current consumption approximately reaches the current limit only under the worst possible conditions. The average current consumption is usually far below the current limit.

A further approach for ensuring the current consumption below the current limit and for operating the system with higher system clocking unless the worst possible conditions occur is adaptive clock masking out.

In each clock cycle, a process step is processed in a circuit section within the time duration predetermined by the pulse width. The supply voltage is provided for processing purposes. The processing is accompanied by the charge reversal of parasitic capacitances. The charge reversal has to be effected within the predetermined pulse duration. Consequently, a shorter pulse duration requires a higher supply voltage.

In the case of clock masking out, individual clock cycles are suppressed so that the effective system clock frequency decreases. Effective system clock frequency is to be understood to mean the average system clock frequency, depending on the pulses of the clocking signal which occur on average.

Since, in the case of clock masking out, time segments with pulses at a clock frequency are followed by time segments in which no pulses are output, the effective system clock frequency is lower than the clock frequency. The length of the individual pulses is not changed by the clock masking out.

A disadvantage of the method described above is that the constantly high supply voltage is accompanied by an inefficiently high current consumption, since the latter is proportional to the supply voltage.

BRIEF DESCRIPTION OF THE DRAWINGS

The invention is explained below on the basis of embodiments with reference to the drawings.

DETAILED DESCRIPTION

Figure 1:
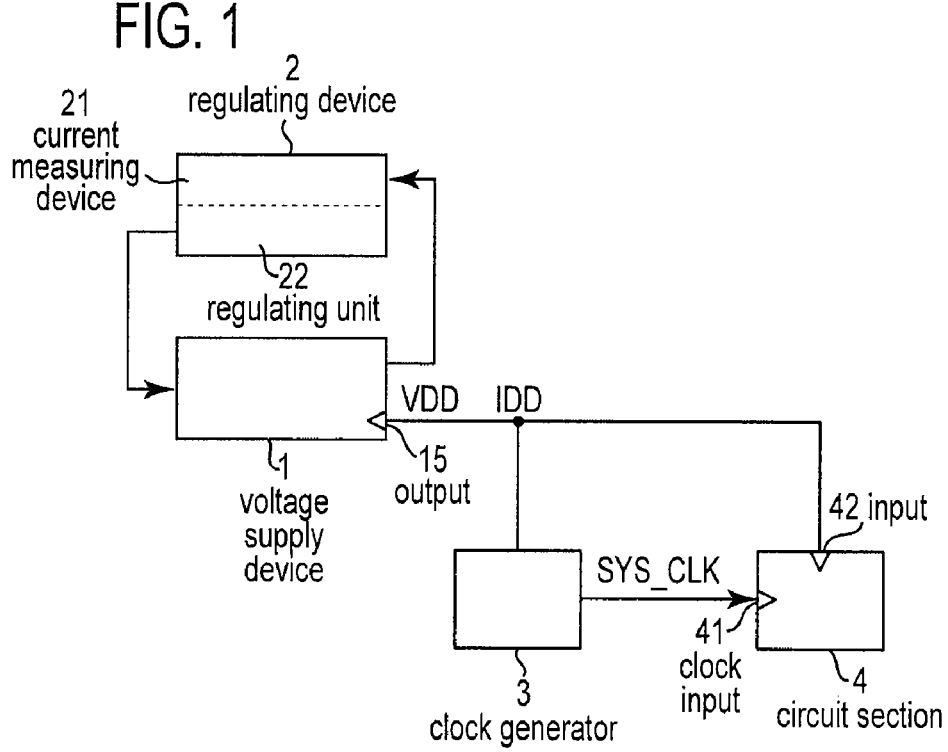
FIG. 1 shows an embodiment of a circuit arrangement.

FIG. 1 shows an embodiment of a circuit arrangement comprising a voltage supply device 1, which comprises an output 15 for providing a supply voltage VDD. A regulating device 2 is coupled to the voltage supply device 1 in such a way that the supply voltage VDD can be varied by means of the regulating device 2.

The regulating device 2 comprises a current measuring device 21 and a regulating unit 22. The current measuring device 21 compares whether an average supply current IDD for feeding the circuit arrangement is above a predetermined current limit. This is usually effected by comparing the supply current IDD with a reference current. Depending on the extent to which the measured supply current IDD is greater or less than the reference current, the supply voltage VDD is varied by means of the regulating unit 22 coupled to the voltage supply device 1. It should be noted that the supply current IDD illustrated in FIG. 1 is provided on the output side of the voltage supply device 1. It is also conceivable to measure and regulate the supply current for only part of the circuit arrangement.

The circuit arrangement furthermore comprises a clock generator 3 coupled to the output 15 of the voltage supply device 1. The clock generator 3 is designed to provide a system clock signal SYS_CLK. In this case, the system clock signal SYS_CLK is dependent on the supply voltage VDD provided. The system clock signal SYS_CLK comprises a multiplicity of clock pulses. The clock generator usually comprises a device for clock masking out, by means of which the supply current is set in such a way that the current limit is not exceeded. The voltage supply device 1 changes the supply voltage in an effective manner, so that only a few clock cycles have to be masked out.

For the generation of the clock pulses, the clock generator 3 comprises an oscillator controlled by the supply voltage VDD. The oscillator-generated signal comprises a periodic sequence of clock pulses having a clock frequency. The clock frequency is varied in a manner dependent on the supply voltage VDD. As the clock frequency rises, the clock pulses become shorter.

A circuit section 4 of the circuit arrangement comprises an input 42 coupled to the output 15 of the voltage supply device 1. The system clock signal SYS_CLK is coupled to a clock input 41 of the circuit section 4. The circuit section 4 is operated in clocked fashion depending on the system clock signal SYS_CLK. In this case, the circuit section 4 is configured in such a way that it can be operated both with a variable supply voltage VDD and with a variable system clock signal SYS_CLK, in particular a variable clock frequency. Such circuit sections may be formed for example as synchronous standard logic.

The circuit section 4 is operated in clocked fashion. During the duration of a clock pulse, the circuit section 4 is fed by the supply voltage VDD in order to carry out internal circuit processes whose processing is provided within a clock cycle. The supply voltage VDD and the pulse duration are to be chosen such that the supply voltage VDD suffices for processing within the pulse duration the process steps provided for a clock cycle. The process steps are accompanied by the charge reversal of parasitic capacitances of the circuit section 4, which has to be effected during the pulse duration. Therefore, a higher supply voltage VDD is required in the case of short pulses than in the case of longer pulses. As an alternative, these charge-reversal processes can proceed more slowly in conjunction with the lower supply voltage VDD. A lower supply voltage VDD is accompanied by a lower current consumption for the charge-reversal processes and thus also a lower current consumption for a clock cycle and this ultimately leads to a higher effective clock frequency for a given current limit.

Figure 2:
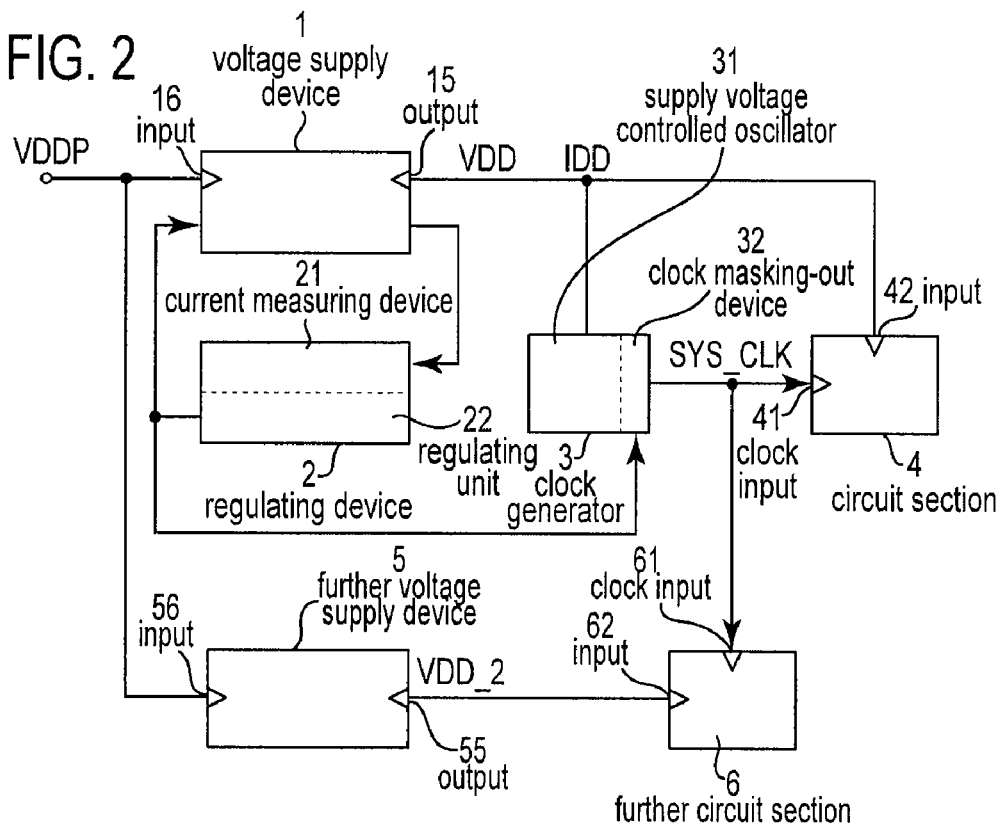
FIG. 2 shows a further embodiment of the circuit arrangement.

FIG. 2 shows a further embodiment of the circuit arrangement. Identical reference symbols specify identical arrangement parts. In order to avoid repetition, matching arrangements will not be described repeatedly.

Alongside the supply-voltage-controlled oscillator 31, the clock generator 3 comprises a clock masking-out device 32 connected downstream and designed to suppress or mask out a fraction of the pulses of the sequence generated by the oscillator. The suppression is controlled depending on a signal provided by the regulating unit 22.

On account of the masking out, the system clock signal SYS_CLK comprises a periodic succession of a group of pulses, the duration and spacing of which correspond to the clock frequency of the oscillator-generated signal, and a pause in which the pulses of the oscillator-generated signal are suppressed. The actual adjustment of the system clock signal SYS_CLK is effected by the setting of the clock frequency by way of the supply voltage VDD. Consequently, the effective system clock frequency is equal to or slightly less than the clock frequency. However, deviations due to different transient recovery durations of the voltage supply device 1 and of the clock masking-out device 32 may lead to a momentary larger difference between effective system clock frequency and clock frequency F_O.

A further voltage supply device 5 is furthermore provided, which provides a further supply voltage VDD_2, which is constant, at an output 55. The further supply voltage VDD_2 is coupled to a further circuit section 6. The system clock signal SYS_CLK is coupled to a clock input 61 of the further circuit section 6. The further circuit section 6 can be operated in a manner dependent on the variable system signal SYS_CLK, but a constant supply voltage VDD_2 is required for operating the further circuit section 6.

A terminal for providing an external supply voltage VDDP is provided. The external supply voltage VDDP is coupled to inputs 16, 56 of the voltage supply devices 1, 5, which convert the supply voltage into the internal supply voltages VDD, VDD_2.

In this case, the current limit may depend on the externally applied voltage VDDP. Consequently, by way of example the external supply voltages 1.8V, 3V and 5V may be accompanied by the current limits 4 mA, 6 mA and 10 mA, respectively.

It is also conceivable to provide a terminal for application of an external clock signal in the circuit arrangement in order to operate some circuit sections with the external clock signal, the clock cycle of which may be constant. This configuration is advantageous for example for peripheral units which communicate with external devices in a manner dependent on the external clock signal.

Figure 3:
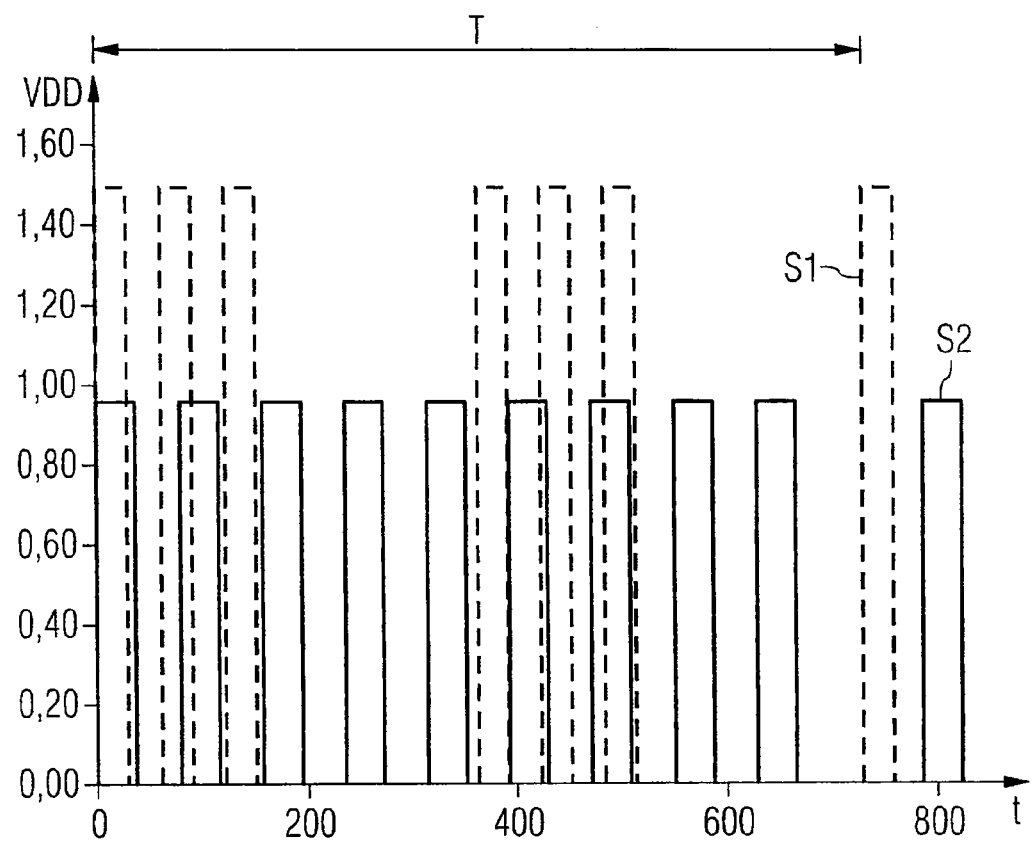
FIG. 3 shows a timing diagram for illustrating a system clock signal adjustment.

FIG. 3 shows a system clock signal for two different cases. A first signal S1 and a second signal S2 are illustrated in terms of the temporal profile. In this case, the supply voltage VDD of the system clock signals is represented against time. The labeling of the axes in volts and nanoseconds is plotted by way of example.

The first signal S1 illustrates operation at a constantly high supply voltage.

The second signal S2 illustrates operation with supply-voltage-dependent clock frequency reduction. Given the same current limit, the signal S2 has the higher effective system frequency.

The first signal S1 comprises a periodic succession of a group of pulses, three pulses being illustrated by way of example, followed by an equally long pause. The length of the pause corresponds to the length of three masked-out pulses.

The second signal S2 comprises a periodic succession of a group of pulses, 9 being illustrated by way of example, followed by a short pause. The length of the pause corresponds to the length of one masked-out pulse. The amplitude of the pulses of the second signal S2 is smaller and the duration of the pulses is longer than in the case of the first signal S1. Wider pulses permit the circuit arrangement to operate with a reduced supply voltage. Consequently, the processes of a clock cycle are processed more slowly. However, there are hardly any pauses provided in the system clocked signal, so that the processing is effected more continuously.

Since more pulses of the second signal S2 than of the first signal S1 are processed within a relatively long time interval T, the effective system clock frequency of the second signal S2 is greater.

Figure 4:
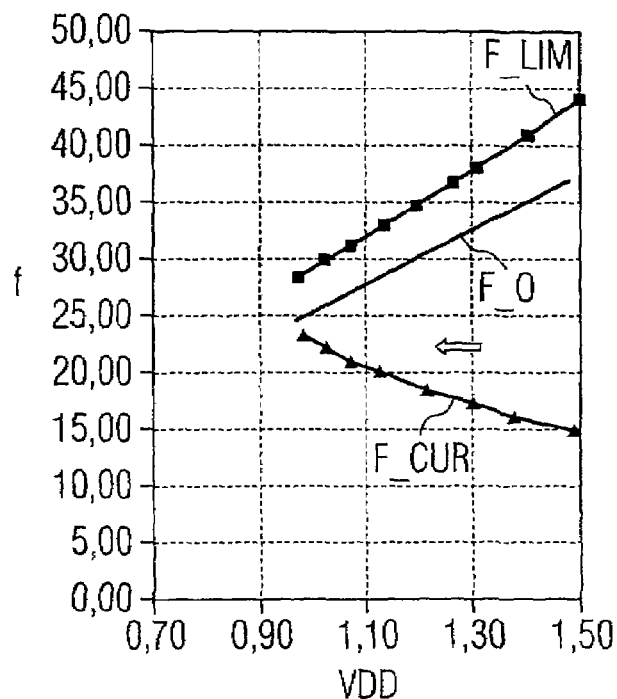
FIG. 4 shows frequency dependencies of the circuit arrangement with an embodiment of a voltage-dependent oscillator.

FIG. 4 shows frequency dependencies of the circuit arrangement with an embodiment of a voltage-dependent oscillator. The illustration shows a voltage-dependent current limiting frequency F_CUR, the voltage-dependent design-limited system limiting frequency F_LIM and the oscillator-generated clock frequency F_O on the basis of characteristic curves against the supply voltage VDD. By way of example, the supply voltage VDD is plotted in volts and the frequency f in megahertz.

Given a constant current limit, the permissible system clock frequency for complying with the current limit rises as the supply voltage VDD decreases. This rise takes place along the current limiting frequency characteristic curve F_CUR.

Give a predetermined supply voltage VDD, the operating point for setting the system clock frequency is predetermined on the current limiting frequency characteristic curve F_CUR. By reducing the supply voltage VDD, the operating point can be shifted and the effective system clock frequency can be increased.

The operating point can thus be shifted toward higher frequencies. The shift toward higher frequencies is limited by the system limiting frequency F_LIM. It decreases as the supply voltage VDD decreases. Furthermore the system limiting frequency F_LIM is temperature-dependent. It increases with lower temperature, for example as a result of cooling. In this case, the system limiting frequency characteristic curve F_LIM is shifted toward higher frequencies. The system limiting frequency F_LIM decreases with higher temperatures, for example as a result of heating during operation. The system limiting frequency characteristic curve F_LIM is shifted toward lower frequencies. The optimum operating point lies at the point of intersection of the system limiting frequency characteristic curve F_LIM and the current limiting frequency characteristic curve F_CUR. In order to provide a safety margin during the operation of the circuit arrangement, it is more advantageous to put the operating point at the point of intersection between the current limiting frequency characteristic curve F_CUR and the clock frequency characteristic curve F_O. The maximum effective system clock frequency is attained at these operating points.

An oscillator that generates a pulse sequence having a constant clock frequency is usually provided in conventional circuit arrangements. A constant clock frequency of 33 MHz is conceivable, by way of example. In such cases, the corresponding clock frequency characteristic curve of the oscillator is a voltage-independent straight line against the supply voltage VDD. If the supply-voltage-dependent system limiting frequency falls below the clock frequency as the supply voltage decreases, then this leads to a failure of the circuit arrangement. Therefore, the clock frequency is to be chosen in such a way that it is below the system limiting frequency with sufficient certainty or the circuit arrangement is to be operated in such a way that the system limiting frequency is not below the clock frequency.

In contrast thereto, FIG. 4 shows that the voltage-dependent clock frequency characteristic curve F_O of the oscillator has the same characteristics and the same gradient as the system limiting frequency characteristic curve F_LIM. However, as a safety margin, the clock frequency characteristic curve F_O is arranged below the system limiting frequency characteristic curve F_LIM, so that the characteristic curves do not intersect and the clock frequency F_O above the supply voltage is lower than the corresponding system limiting frequency F_LIM. This means that a supply-voltage-dependent variation in the clock frequency F_O now on no account leads to the system limiting frequency F_LIM being exceeded. The design becomes significantly more robust since this clock frequency control always provides for a sufficient distance between the clock frequency F_O and the system limiting frequency F_LIM.

The clock frequency characteristic curve of the oscillator F_O can be varied during a test operating mode. The adjustment is effected on the basis of measurements of different worst-case scenarios. Given an optimally adjusted clock frequency characteristic curve F_O, the voltage-controlled oscillator generates the optimum clock frequency F_O only in the manner controlled by the supply voltage VDD.

Figure 5:
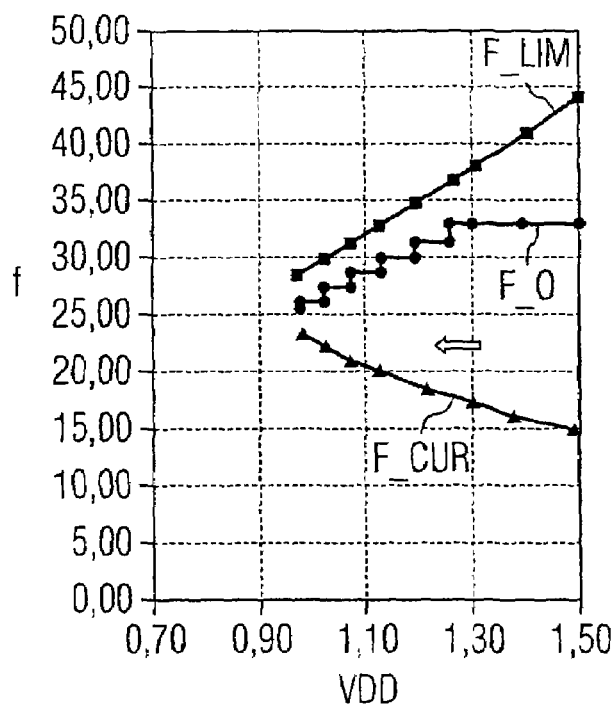
FIG. 5 shows the frequency dependencies of the circuit arrangement with a further embodiment of the oscillator.

FIG. 5 shows the clock frequency characteristic curve F_O of a further embodiment of a voltage-controlled oscillator alongside the system limiting frequency characteristic curve F_LIM and the current limiting frequency characteristic curve F_CUR. The clock frequency characteristic curve F_O is stepped in this case. Consequently, the reduction of the clock frequency F_O is no longer effected directly with the reduction of the supply voltage VDD. Firstly, the clock frequency F_O is reduced and then the supply voltage VDD is reduced. According to a similar principle, firstly the supply voltage VDD is increased and then the clock frequency F_O is increased.

Oscillators configured in this way have a control input, for example, via which they are driven with the supply voltage VDD. This embodiment does not have the system-inherent optimum clock frequency characteristic curve F_O.

Embodiments in which the oscillator is driven by the regulating device, for example digitally, are also conceivable. In this case, the supply-voltage-dependent control of the oscillator is effected by means of the regulation which increases the clock frequency in accordance with the supply voltage. This adaptation may be effected in alternate supply voltage and clock frequency change steps in a manner similar to the characteristic curve in FIG. 5. Consequently, in one step only one of the two parameters is varied for the adjustment.

The regulating device 2, which simultaneously acts as current limiting, makes it possible to adjust the optimum effective system clock frequency during operation. Alongside the adjustment of the clock frequency F_O, it is possible to use pulse suppression in the various configurations of the oscillator for the adjustment. In the embodiment illustrated in FIG. 2, the pulse suppression 32 is driven by the regulating unit 22. The current control is thus effected both by the variation of the supply voltage VDD and by the targeted adaptation of the effective system clock frequency by means of the pulse suppression. In this case, the pulse suppression merely serves for fine adjustment, since the actual change in the effective system clock frequency is already effected by the supply-voltage-dependent variation of the clock frequency F_O of the oscillator.

The setting of the effective system clock frequency may be effected at the beginning of operation of the circuit arrangement proceeding from the maximum supply voltage VDD and the associated current limiting frequency F_CUR on the current limiting frequency characteristic curve F_CUR. In the case of a temporarily increased supply current that is to be expected, firstly a large number of pulses are suppressed. After stabilization of the regulation, the clock generator outputs a pulse sequence in which, by way of example, only every $20^{th}$ pulse is suppressed.

In the case of a temporarily reduced current demand that is to be expected, firstly no pulses are suppressed upon the system start. After the adjustment of the stabilized effective system clock frequency, the system clock signal CLK_SYS comprises a pulse sequence in which, by way of example, only every $20^{th}$ pulse is suppressed.

The regulation is aimed at a constant current consumption. For regulation of the supply voltage, the fraction of the clock cycles which is masked out is detected over a relatively long interval. If the fraction is within certain bounds, no variation takes place. If the fraction is above the bounds, the supply voltage VDD is reduced. If the fraction is below the bounds, the supply voltage VDD is increased.

The switching on of current-consuming circuit sections and also the programming of nonvolatile memory modules and the increased current demand associated therewith lead to a reduction of the effective system clock frequency and —accompanying this—the supply voltage. In order that the current limit is not exceeded, the effective system clock frequency has to be reduced. This is more efficient with regard to the effective system clock frequency than if only the effective system clock frequency is reduced with the supply voltage being unchanged.

The switching off of the current-consuming circuit section and also the ending of the programming of the nonvolatile memory modules has the effect that the supply voltage rises, and therefore so does the effective system clock frequency.

In order to ensure the functioning of the circuit arrangement, both the variation of the supply voltage and the variation of the system clock frequency are effected only within certain predetermined bounds. By way of example, the bounds in the case of the supply voltage may be within the range of between 0.9 and 1.5V.

The use of the circuit arrangement described above means that the current consumption decreases by approximately 33% with an increase in the processing speed by 50% if the supply voltage is reduced from 1.5V to 1.0V.

One inventive embodiment of a circuit arrangement comprises a controllable voltage supply device which comprises an output for providing a variable supply voltage and a supply-voltage-controlled clock generator for providing a system clock signal having a variable effective system clock frequency. The clock generator is coupled to the output of the voltage supply device. The circuit arrangement further comprises a circuit section comprising a supply terminal, which is coupled to the output of the voltage supply device, and a clock input, to which the system clock signal is coupled, and a regulating device, which is designed for determining a supply-voltage-dependent supply current value and for detecting the extent to which the supply current value lies within a predetermined current value range. The regulating device is coupled to the voltage supply device in such a way that the supply voltage provided is regulated to the effect that the supply current value lies within the predetermined current value range.

One advantage of that embodiment of the circuit arrangement is that both the clock frequency of the system clock signal and the supply voltage are varied in a manner coupled to one another in order to set the effective system clock frequency without the current limit being exceeded.

During operation of the circuit arrangement, the supply voltage is permanently adapted by the regulating device, for example in the event of load changes or temperature changes. The adaptation is effected particularly in the event of changing system requirements and changing boundary conditions during operation of the circuit arrangement.

The clock frequency control for the circuit arrangement is effected in a manner dependent on the variable supply voltage. In one embodiment, the supply voltage drives an oscillator which generates a pulse sequence for the system clock signal. The clock frequency of the system clock signal depends on the supply voltage. The circuit sections of the circuit arrangement are operated in clocked fashion in a manner dependent on the system clock signal.

The clock frequency is controllable along a clock frequency characteristic curve specifying the dependence of the clock frequency on the supply voltage. In an advantageous manner, in one embodiment, the clock frequency characteristic curve, in order to have a safety margin, is below a system limiting frequency characteristic curve specifying the dependence of a permissible system limiting frequency of the circuit arrangement on the supply voltage.

The system limiting frequency of one embodiment depends on the critical path of a sequential logic. The minimum required time for the processing of the critical path predetermines the minimum required pulse duration and thus the system limiting frequency. The system limiting frequency rises as the supply voltage increases. The supply-voltage-dependent clock frequency is lower than the corresponding system limiting frequency. System failures on account of clock frequencies above the system limiting frequency are thereby avoided.

If the clock frequency characteristic curve has the same or virtually the same gradient as the system limiting frequency characteristic curve the optimum clock frequency is always set independently of voltage and temperature fluctuations.

The robustness of the system is increased by a clock frequency characteristic curve adapted in this way. In the event of dips in the supply voltage, the clock frequency is immediately adapted. In contrast thereto, supply voltage dips in the case of clock generators with a constant characteristic curve or relatively slow readjustment cannot readjust the clock frequency in the case of supply voltage dips or can readjust it too slowly, so that the clock frequency lies above the system limiting frequency, which leads to system failures.

In an alternative embodiment, the clock frequency characteristic curve is stepped. An iterative adaptation of the clock frequency provided by the oscillator is this achieved.

In one embodiment, the clock generator advantageously comprises a clock masking out which is connected downstream of the oscillator in order to mask out a fraction of the clock pulses of the sequence at the output of the clock generator. The effective system clock frequency can thus be adjusted.

In one embodiment, a control input of the clock masking out can advantageously be coupled to the regulating device in order to precisely adjust the supply current.

In one embodiment, the supply voltage and, accompanying the latter, the clock frequency and the effective system clock frequency can be varied only within a predetermined range, in order not to jeopardize the functionality of the circuit arrangement by operation in extreme modulation ranges.

In one embodiment of the circuit arrangement, at least one second circuit element is provide which is coupled to a further voltage supply device for providing a further supply voltage, which is constant. A supply voltage is thus provided for circuit sections whose operation requires a constant voltage. These are analog circuit sections, by way of example.

The voltage supply device is preferably coupled to a supply terminal in order to convert a supply voltage on the output side into the internally provided supply voltage. The standardization may provide for a current limit of 10 mA to be provided at an external voltage of 5V, a current limit of 6 mA to be provided at 3V, and a current limit of 4 mA to provided at 1.8V.

A method embodiment for regulating a supply current comprises the steps of: feeding a supply voltage to a circuit section operated in clocked fashion, feeding a system clock signal to the circuit section, controlling an effective clock frequency of the system clock signal in a manner dependent on the supply voltage, determining a supply-voltage-dependent supply current value, comparing the supply current value with a predetermined reference value, and varying the supply voltage in a manner dependent on the comparison.

An advantage of this configuration of the method is that the supply voltage and the system clock signal are simultaneously adapted in a manner coupled to one another in order to have an effective system clock frequency that is as high as possible for a predetermined current limit.

In this case, the clock frequency of the system clock signal advantageously depends directly on the supply voltage provided. The dependence is ideally linear or virtually linear.

An adaptation possibility for altering the supply current is to mask out a fraction of the clock pulses. The measured supply current is the manipulated variable in this case.

In order to avoid operation in extreme modulation ranges and accompanying parasitic effects, ranges within which the supply voltage and the clock frequency are variable are predetermined.

What is claimed is:

1. A circuit arrangement comprising:
   a voltage supply device, which has an output, and configured to provide a variable supply voltage;
   a supply-voltage-controlled clock generator, which is coupled to the output of the voltage supply device, and is configured to provide a system clock signal having a variable effective system clock frequency;
   a circuit section having a supply terminal, which is coupled to the output of the voltage supply device, and a clock input, which is configured to receive the system clock signal; and
   a regulating device configured to determine a supply-voltage-dependent supply current value and to detect the extent to which the supply current value lies within a predetermined current value range, and which is coupled to the voltage supply device such that the supply voltage is regulated based on whether the supply current value lies within the predetermined current value range.

2. The circuit arrangement as claimed in claim 1, wherein the clock generator comprises a supply-voltage-controlled oscillator configured to generate a periodic sequence of clock pulses having a clock frequency for the system clock signal, the clock frequency being controlled by the supply voltage.

3. The circuit arrangement as claimed in claim 2, wherein the clock frequency is controllable by the supply voltage along a clock frequency characteristic curve that specifies the dependence of the clock frequency on the supply voltage.

4. The circuit arrangement as claimed in claim 3, wherein the clock frequency characteristic curve is identical to a system limiting frequency characteristic curve or lies at lower frequencies than the system limiting frequency characteristic curve, the system limiting frequency characteristic curve specifying the dependence of the system limiting frequency of the circuit arrangement on the supply voltage.

5. The circuit arrangement as claimed in claim 4, wherein the clock frequency characteristic curve has the same or virtually the same gradient as the system limiting frequency characteristic curve.

6. The circuit arrangement as claimed in claim 4, wherein the clock frequency characteristic curve is stepped.

7. The circuit arrangement as claimed in claim 2, wherein the clock generator comprises a clock masking-out device connected downstream of the oscillator configured to mask out a fraction of the clock pulses of the sequence.

8. The circuit arrangement as claimed in claim 1, wherein the supply voltage is variable within a predetermined range.

9. The circuit arrangement as claimed in claim 1, further comprising:
   a further voltage supply device configured to provide a constant supply voltage; and
   a further circuit section configured to receive the constant supply voltage and the system clock signal, and is configured to be operated in a manner dependent on the system clock signal.

10. A circuit arrangement comprising:
    a voltage supply device, which has an output, and is configured to provide a variable supply voltage;
    a clock generator, which is coupled to the output of the voltage supply device, and is configured to provide a system clock signal having a variable effective system clock frequency,
    wherein the clock generator comprises a supply-voltage-controlled oscillator configured to generate a periodic sequence of clock pulses having a clock frequency that is controllable by the supply voltage along a clock frequency characteristic curve;
    a circuit section having a supply terminal, which is coupled to the output of the voltage supply device, and a clock input, which is configured to receive the system clock signal; and
    a regulating device configured to determine a supply-voltage-dependent supply current value and to detect the extent to which the supply current value lies within a predetermined current value range, and which is coupled to the voltage supply device such that the supply voltage is regulated based on whether the supply current value lies within the predetermined current value range.

11. The circuit arrangement as claimed in claim 10, wherein the clock frequency characteristic curve is identical to a system limiting frequency characteristic curve or lies at lower frequencies than the system limiting frequency characteristic curve, the system limiting frequency characteristic curve specifying the dependence of the system limiting frequency of the circuit arrangement on the supply voltage.

12. The circuit arrangement as claimed in claim 11, wherein the clock frequency characteristic curve has the same or virtually the same gradient as the system limiting frequency characteristic curve.

13. The circuit arrangement as claimed in claim 10, wherein the clock generator comprises a clock masking-out device, which is connected downstream of the oscillator, and is configured to mask out a fraction of the clock pulses of the sequence, the clock generator being coupled to the regulating device.

14. The circuit arrangement as claimed in claim 10, wherein the supply voltage and/or the effective system clock frequency is variable such that a predetermined process sequence of the circuit arrangement is processed within a predetermined time frame.

15. The circuit arrangement as claimed in claim 10, wherein the voltage supply device comprises a terminal for application of an external voltage.

16. The circuit arrangement as claimed in claim 10, wherein the current value range is variable.

17. The circuit arrangement as claimed in claim 10, further comprising:
    a further voltage supply device configured to provide a constant supply voltage; and
    a further circuit section configured to receive the constant supply voltage and the system clock signal, and is configured to be operated in a manner dependent on the system clock signal.

18. A method for regulating a supply current, the method comprising:
    feeding a supply voltage to a circuit section operated in clocked fashion;
    feeding a system clock signal to the circuit section;
    controlling an effective clock frequency of the system clock signal in a manner dependent on the supply voltage;
    determining a supply-voltage-dependent supply current value;
    comparing the supply current value with a predetermined reference value; and
    varying the supply voltage in a manner dependent on the comparison.

19. The method as claimed in claim 18, further comprising generating a periodic sequence of clock pulses having a clock frequency, for the system clock signal, the clock frequency being controlled by the supply voltage.

20. The method as claimed in claim 19, further comprising controlling the clock frequency along a clock frequency characteristic curve by means of the supply voltage, the clock frequency characteristic curve specifying the dependence of the clock frequency on the supply voltage.

21. The method as claimed in claim 20, further comprising adjusting the clock frequency characteristic curve, so that the clock frequency characteristic curve is identical to a system limiting frequency characteristic curve or lies at lower frequencies than the system limiting frequency characteristic curve, the system limiting frequency characteristic curve specifying the dependence of the system limiting frequency of the circuit arrangement on the supply voltage.

22. The method as claimed in claim 21, further comprising adjusting the clock frequency characteristic curve in such a way the clock frequency characteristic curve has the same or virtually the same gradient as the system limiting frequency characteristic curve.

23. The method as claimed in claim 21, wherein the clock frequency characteristic curve is stepped.

24. The method as claimed in claim 18, wherein the generation of the system clock signal comprises masking out a fraction of the clock pulses of the sequence.

25. The method as claimed in claim 18, further comprising varying the supply voltage within a predetermined range.

26. A method for regulating a supply current, the method comprising:
   feeding a supply voltage to a circuit section operated in clocked fashion;
   feeding a system clock signal to the circuit section;
   generating a periodic sequence of clock pulses having a clock frequency for a system clock signal having an effective clock frequency, the clock frequency being controlled by the supply voltage along a clock frequency characteristic curve;
   determining a supply-voltage-dependent supply current value;
   comparing the supply current value with a predetermined reference value; and
   varying the supply voltage in a manner dependent on the comparison.

27. The method as claimed in claim 26, further comprising adjusting the clock frequency characteristic curve, so that the clock frequency characteristic curve is identical to a system limiting frequency characteristic curve or lies at lower frequencies than the system limiting frequency characteristic curve, the system limiting frequency characteristic curve specifying the dependence of the system limiting frequency of the circuit arrangement on the supply voltage.

28. The method as claimed in claim 27, further comprising adjusting the clock frequency characteristic curve such that the clock frequency characteristic curve has the same or virtually the same gradient as the system limiting frequency characteristic curve.

29. The method as claimed in claim 26, further comprising:
   masking out a fraction of the clock pulses of the sequence, for the purpose of generating the system clock signal; and
   controlling the fraction of the suppressed clock pulses in a manner dependent on the comparison.

30. The method as claimed in claim 26, comprising varying the supply voltage and/or the effective system frequency in such a way that a predetermined process sequence of the circuit arrangement is processed within a predetermined time frame.

31. The method as claimed in claim 26, further comprising providing an external voltage and converting the latter into the supply voltage.

32. The method as claimed in claim 31, wherein the reference value is dependent on the external supply voltage.

33. A circuit arrangement comprising:
   a voltage supply device, which has an output, and that provides a variable supply voltage;
   a supply-voltage-controlled clock generating means, which is coupled to the output of the voltage supply device, for providing a system clock signal having a variable effective system clock frequency;
   a circuit section having a supply terminal, which is coupled to the output of the voltage supply device, and a clock input, which receives the system clock signal; and
   a regulating means for determining a supply-voltage-dependent supply current value and for detecting the extent to which the supply current value lies within a predetermined current value range, and which is coupled to the voltage supply device such that the supply voltage is regulated based on whether the supply current value lies within the predetermined current value range.

* * * * *